US012630079B2

(12) United States Patent
Park

(10) Patent No.: US 12,630,079 B2
(45) Date of Patent: May 19, 2026

(54) VEHICLE SYSTEM

(71) Applicant: HYUNDAI MOBIS CO., LTD., Seoul (KR)

(72) Inventor: Dong Seo Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 186 days.

(21) Appl. No.: 18/146,410

(22) Filed: Dec. 26, 2022

(65) Prior Publication Data

US 2024/0075871 A1 Mar. 7, 2024

(30) Foreign Application Priority Data

Sep. 6, 2022 (KR) ......................... 10-2022-0112772

(51) Int. Cl.
*B60Q 1/24* (2006.01)
*B60Q 1/00* (2006.01)

(52) U.S. Cl.
CPC ........... *B60Q 1/249* (2022.05); *B60Q 1/0088* (2013.01)

(58) Field of Classification Search
CPC ........ B60Q 1/249; B60Q 1/0088; B60Q 1/00; B60R 16/033; Y02T 10/70; G07C 5/0866; H02J 7/342
See application file for complete search history.

(56) References Cited

U.S. PATENT DOCUMENTS

| | | | | |
|---|---|---|---|---|
| 5,053,677 A | * | 10/1991 | Sanner | ................... B60Q 9/001 |
| | | | | 315/83 |
| 2005/0285559 A1 | * | 12/2005 | Siddiqui | ................... B60L 1/14 |
| | | | | 320/103 |

| | | | | |
|---|---|---|---|---|
| 2008/0285803 A1 | | 11/2008 | Madsen | |
| 2010/0142194 A1 | * | 6/2010 | Masuda | ................... B60Q 1/04 |
| | | | | 362/183 |
| 2015/0204487 A1 | * | 7/2015 | Scapa | ................... F21K 9/278 |
| | | | | 362/221 |
| 2018/0043819 A1 | * | 2/2018 | Kim | ................... B60Q 1/085 |
| 2018/0149681 A1 | * | 5/2018 | Chakrabarty | ........... B60L 1/006 |

(Continued)

FOREIGN PATENT DOCUMENTS

| | | |
|---|---|---|
| DE | 10137850 A1 | 5/2002 |
| DE | 102005018175 A1 | 10/2006 |

(Continued)

OTHER PUBLICATIONS

Machine Translation KR101686421B1 (year: 2016).*
Office Action issued Mar. 21, 2023 in corresponding German Patent Application No. 102022214297.7.

*Primary Examiner* — Anne Marie Antonucci
*Assistant Examiner* — Jodi Jones
(74) *Attorney, Agent, or Firm* — Novo TechIP International PLLC

(57) ABSTRACT

The present invention provides a vehicle system in which an IR lamp operates even when the vehicle is in a parking mode, but relates to a more efficient vehicle system by minimizing power consumption of a battery. The vehicle system includes an IR lamp including a plurality of LEDs and irradiating light of infrared wavelengths, and a control unit connecting the IR lamp to a main battery of a vehicle when the vehicle is in a driving mode and connecting the IR lamp to an auxiliary battery of the vehicle when the vehicle is in a parking mode to operate the IR lamp.

6 Claims, 4 Drawing Sheets

(56) References Cited

U.S. PATENT DOCUMENTS

| | | | |
|---|---|---|---|
| 2018/0154793 A1 | | 6/2018 | Jun et al. |
| 2019/0315232 A1* | 10/2019 | Ing ......................... B60L 58/26 |
| 2019/0335554 A1* | 10/2019 | Hodrinsky ............ H02M 7/219 |

FOREIGN PATENT DOCUMENTS

| | | | |
|---|---|---|---|
| DE | 102011084951 A1 | 4/2013 |
| KR | 101433928 B1 | 8/2014 |
| KR | 101686421 B1 * | 12/2016 |

* cited by examiner

VEHICLE SYSTEM

CROSS-REFERENCE TO RELATED APPLICATIONS

This application claims priority under 35 U.S.C. § 119 to Korean Patent Application No. 10-2022-0112772, filed on Sep. 6, 2022, in the Korean Intellectual Property Office, the disclosure of which is incorporated herein by reference in its entirety.

TECHNICAL FIELD

The following disclosure relates to a vehicle system, and more particularly, to a vehicle system including an infrared (IR) lamp capable of recognizing movement around a vehicle using the IR lamp even when the vehicle is parked, but minimizing power consumption of a battery that drives the IR lamp.

BACKGROUND

Lamps used in vehicles are mainly used for lighting. Some examples of the types of lamps used in vehicles include: a head lamp, daytime running lights (DRL), fog lamps, a turn signal lamp, emergency light, a tail lamp, a brake lamp, a backup lamp, and the like. These lamps are used to secure visibility of drivers, drivers of other vehicles, and pedestrians by using wavelengths in a visible range. Recently, IR lamps that detect the surroundings of a vehicle using infrared rays are being developed. This means that the technology is being developed in direction of increasing safety and convenience of a vehicle by not only securing visibility through the human eye, but also securing visibility using cameras and IR lamps.

Such a conventional IR lamp receives power from a vehicle battery and uses the power as a power supply of the IR lamp, and operates LEDs included in the IR lamp only by simple on/off operations such as turning on and off. In addition, the IR lamp operates only while driving, and when an escort operation is finished during parking, the IR lamp is designed not to consume power by automatically cutting off the power supply, resulting in causing a problem in that the function of securing visibility of the IR lamp is not utilized during parking.

SUMMARY

An embodiment of the present invention is directed to providing a vehicle system, which could be a power system, light system, camera system, etc. for a vehicle, etc., in which an IR lamp operates even when a vehicle is in a parking mode, but provides a more efficient vehicle system by minimizing power consumption of a battery.

In one general aspect, a vehicle system includes: an IR lamp including a plurality of LEDs and irradiating light of infrared wavelengths; and a control unit connecting the IR lamp to a main battery of a vehicle when the vehicle is in a driving mode and connecting the IR lamp to an auxiliary battery of the vehicle when the vehicle is in a parking mode to operate the IR lamp.

When the vehicle is in the driving mode, the control unit may control to turn on all LEDs included in the IR lamp.

When the vehicle is in the parking mode, the control unit may control to turn on some of a plurality of LEDs included in the IR lamp.

When the vehicle is in the driving mode, the control unit may control a current applied to a plurality of LEDs included in the IR lamp to a maximum value.

When the vehicle is in the parking mode, the control unit may lower the current applied to the plurality of LEDs included in the IR lamp.

The vehicle system may further include: the main battery and the auxiliary battery, in which the control unit may charge the auxiliary battery using the main battery during the driving mode of the vehicle.

The vehicle system may further include: a camera installed in the vehicle to capture surroundings of the vehicle.

The vehicle system may further include: the main battery and the auxiliary battery, in which the control unit may connect the main battery to the camera during the driving mode of the vehicle, and connect the auxiliary battery to the camera during the parking mode of the vehicle.

DETAILED DESCRIPTION

Figure 1:
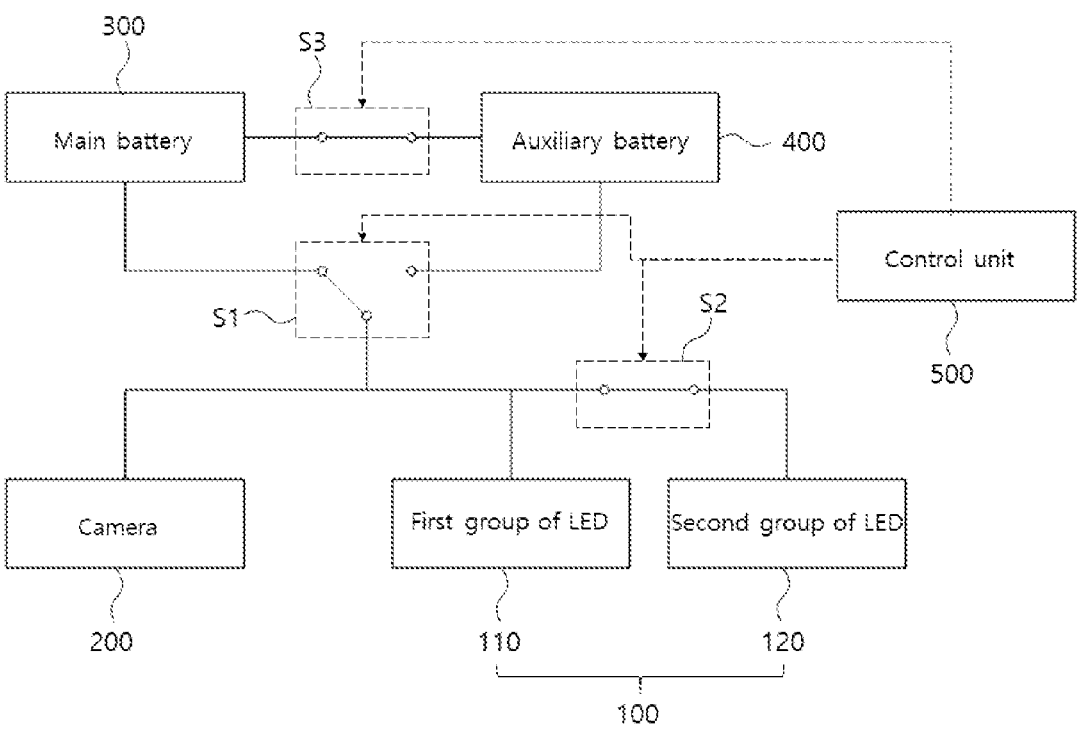
FIG. 1 is a block diagram of a vehicle system in a driving mode according to a first embodiment of the present invention.

The above-described objects, features, and advantages of the present disclosure will become more obvious from the following detailed description provided in relation to the accompanying drawings. The following specific structural or functional descriptions are only exemplified for the purpose of explaining the embodiments according to the concept of the present invention, and the embodiments according to the concept of the present invention may be implemented in various forms and should not be construed as limited to the embodiments described herein or in the application. Since embodiments according to the concept of the present disclosure may be variously modified and may have several forms, specific embodiments will be illustrated in the accompanying drawings and will be described in detail in the present specification or application. However, it is to be understood that the present disclosure is not limited to specific embodiments, but includes all modifications, equivalents, and substitutions falling in the spirit and the scope of the present disclosure. Terms such as 'first,' 'second,' or the like, may be used to describe various components, but these components are not to be construed as being limited to these terms. The terms are used only to distinguish one component from another component. For example, a 'first' component may be named a 'second' component and the 'second' component may also be named the 'first' component, without departing from the scope of the present invention. It is to be understood that when one component is referred to as being "connected to" or "coupled to" another component, it may be connected directly to or coupled directly to another component or be connected to or coupled to another component with the other component interposed therebetween. On the other hand, it is to be understood that when one component is referred to as being "connected directly to" or "coupled directly to" another component, it may be connected to or coupled to another component without the other component interposed therebetween. Other expressions for describing the relationship between components, such as between and immediately between or adjacent to and directly adjacent to, etc., should be interpreted similarly. Terms used in the present specification are used only in order to describe specific embodiments rather than limiting the present disclosure. Singular forms are intended to include plural forms unless the context clearly indicates otherwise. It is to be understood that terms "include", "have", or the like, used in the present specification specify the presence of features, numerals, steps, operations, components, parts, or a combination thereof described in the present specification, but do not preclude the presence or addition of one or more other features, numerals, steps, operations, components, parts, or a combination thereof. Unless indicated otherwise, it is to be understood that all the terms used in the specification including technical and scientific terms have the same meaning as those that are generally understood by those who are skilled in the art. Terms generally used and defined in a dictionary are to be interpreted as the same meanings with meanings within the context of the related art, and are not to be interpreted as ideal or excessively formal meanings unless clearly indicated in the present specification. Hereinafter, exemplary embodiments of the present invention will be described in detail with reference to the accompanying drawings. Like reference numerals proposed in each drawing denote like components.

First Embodiment

FIG. 1 is a block diagram of a vehicle system operating in a driving mode according to a first embodiment of the present invention.

As illustrated in FIG. 1, a vehicle system according to the first embodiment of the present invention includes an infrared (IR) lamp 100, a camera 200, a main battery 300, an auxiliary battery 400, and a control unit 500.

The IR lamp 100 is a device installed in a vehicle to secure visibility around the vehicle. The IR lamp 100 may be installed in various positions. For example, the IR lamp 100 may be installed together with the camera 200 to operate together with the camera 200.

The IR lamp 100 includes a plurality of LEDs. Each of the LEDs included in the IR lamp 100 may irradiate light of an infrared wavelength. The plurality of LEDs included in the IR lamp 100 of this embodiment may be divided into a first group of LEDs 110 and a second group of LEDs 120, respectively. Each of the first group of LEDs 110 and the second group of LEDs 120 may include at least one LED.

The camera 200 is a device serving as a black box, and may capture an image of an area around the vehicle. The camera 200 operates together with the IR lamp 100 to secure visibility around the vehicle.

The main battery 300 is a battery that supplies power to various devices related to the driving of the vehicle when (or in response to determining that) the vehicle is operating in the driving mode.

The auxiliary battery 400 is a battery that supplies power to devices that are not directly related to the driving of the vehicle or operate with relatively low power when the vehicle is operating in the driving mode.

The control unit 500 connects the IR lamp 100 to the main battery 300 of the vehicle when the vehicle is operating in the driving mode, and connects the IR lamp 100 to the auxiliary battery 400 of the vehicle when (or in response to determining that) the vehicle is operating in a parking mode, thereby operating the IR lamp 100 even when the vehicle is operating in the parking mode. Like the IR lamp 100, the control unit 500 connects the camera 200 to the main battery 300 when the vehicle is operating in the driving mode, and connects the camera 200 to the auxiliary battery 400 when the vehicle is operating in the parking mode.

The vehicle system according to the first embodiment of the present invention may further include a first switch S1 to allow the control unit 500 to control the connection relationship between the IR lamp 100, the camera 200, the main battery 300, and the auxiliary battery 400 as described above. The main battery 300 and the auxiliary battery 400 are connected in parallel to each other, and the first switch S1 is located between the main battery 300/the auxiliary battery 400 and the camera 200/the IR lamp 100 to determine the battery connected to the camera 200 and the IR lamp 100. The first switch S1 may be controlled by the control unit 500, and in the driving mode, the first switch S1 connects the main battery 300 to the camera 200 and the IR lamp 100 to supply power from the battery 300 to the camera 200 and the IR lamp 100.

Figure 2:
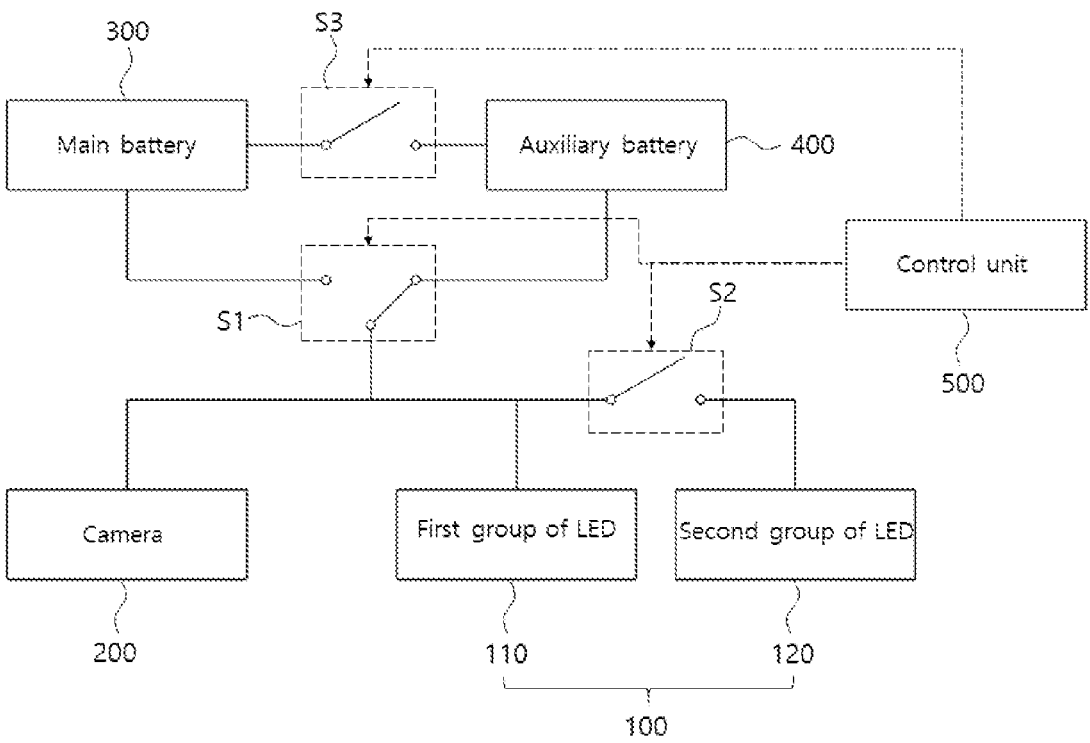
FIG. 2 is a block diagram of the vehicle system in a parking mode according to the first embodiment of the present invention.

FIG. 2 is a block diagram of the vehicle system in a parking mode according to the first embodiment of the present invention.

As illustrated in FIG. 2, when the vehicle to which the vehicle system according to the first embodiment of the present invention is applied is operating in the parking mode. The first switch S1 is switched so that the auxiliary battery 400 supplies power to the camera 200 and the IR lamp 100. Since the auxiliary battery 400 stores relatively low energy compared to the main battery 300, when the IR lamp 100 consumes power as when connected to the main battery 300 in the driving mode, the auxiliary battery 400 is quickly discharged. In order to prevent this, when the vehicle is operating in the parking mode, the control unit 500 controls only the first group of LEDs 110 among the first group of LEDs 110 and the second group of LEDs 120 included in the IR lamp 100 to be turned on, and the second group of LEDs 120 to be turned off. That is, when the vehicle is operating in the parking mode, the control unit 500 reduces power consumption of the IR lamp 100 so that the auxiliary battery 400 supplies power to the IR lamp 100 for as long as possible.

In order to control the second group of LEDs 120 to be turned on/off as described above, the first group of LEDs 110 and the second group of LEDs 120 are connected in parallel with the auxiliary battery 400, and a second switch S2 is provided between the auxiliary battery 400 and the second group of LEDs 120. The second switch S2 is controlled by the control unit 500.

When the vehicle is operating in the driving mode, the auxiliary battery 400 is not used and needs to be charged. The auxiliary battery 400 is charged through the main battery 300. That is, when the vehicle is operating in the driving mode, the main battery 300 and the auxiliary battery 400 are electrically connected so that the main battery 300 charges the auxiliary battery 400. When the vehicle is operating in the parking mode, the main battery 300 and the auxiliary battery 400 may not be electrically connected. For the operation as described above, the vehicle system according to the first embodiment of the present invention may further include a third switch S3. The third switch S3 is provided between the main battery 300 and the auxiliary battery 400 to determine whether the main battery 300 and the auxiliary battery 400 are connected. The third switch S3 may be controlled by the control unit 500.

Second Embodiment

Figure 3:
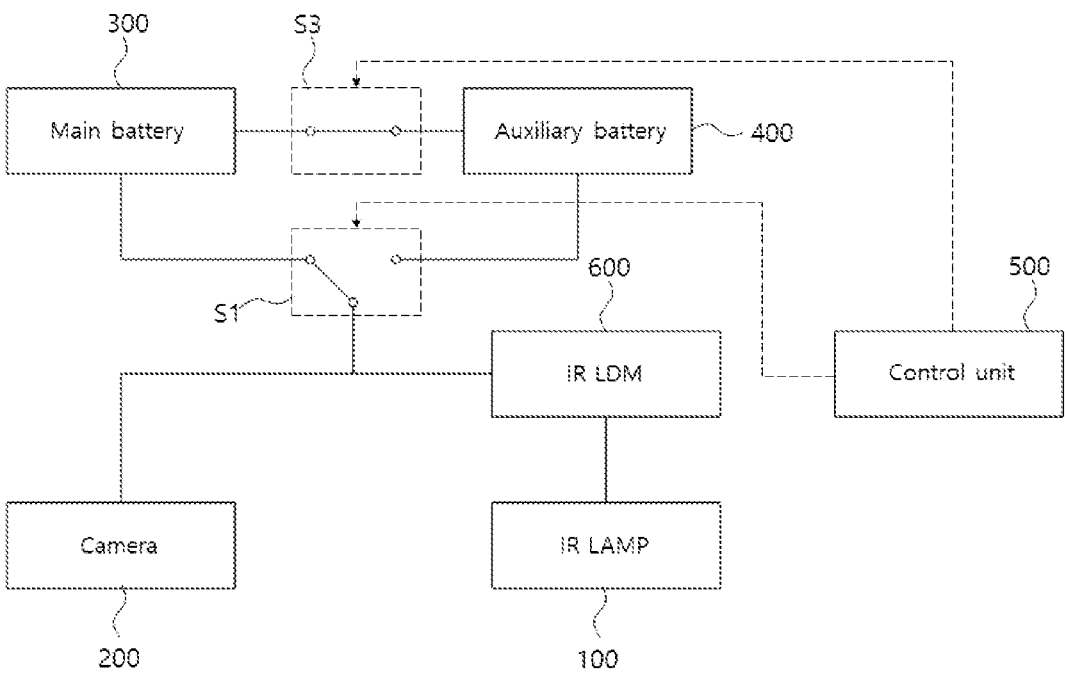
FIG. 3 is a block diagram of a vehicle system in a driving mode according to a second embodiment of the present invention.

FIG. 3 is a block diagram of a vehicle system in a driving mode according to the second embodiment of the present invention.

As illustrated in FIG. 3, the vehicle system according to the second embodiment of the present invention excludes the second switch S2 in the vehicle system according to the first embodiment of the present invention described above, and includes an IR LED drive module (IR LDM) 600.

The IR LDM 600 is a device for controlling the IR lamp 100, and is substantially included in the vehicle system according to the first embodiment of the present invention, but is not separately indicated and is controlled by the control unit 500.

When the vehicle applied to the vehicle system according to the present embodiment is operating in the driving mode, the control unit 500 controls the first switch S1 so that the main battery 300 is connected to the camera 200 and the IR lamp 100 to supply power from the main battery 300 to the camera 200 and the IR lamp 100, and controls the third switch S3 to connect between the main battery 300 and the auxiliary battery 400 so that the main battery 300 charges the auxiliary battery 400. In this case, the control unit 500 may transmit a control signal to the IR LDM 600 to control the IR lamp 100 to operate at the maximum amount of light.

Figure 4:
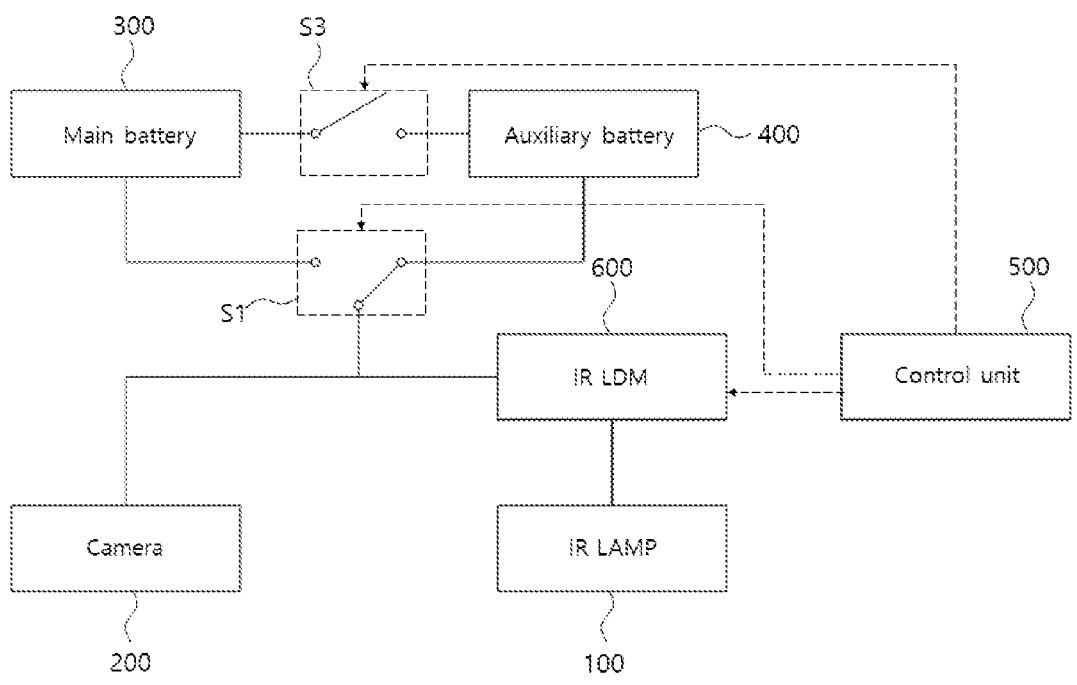
FIG. 4 is a block diagram of the vehicle system in a parking mode according to the second embodiment of the present invention.

FIG. 4 is a block diagram of the vehicle system in a parking mode according to the second embodiment of the present invention.

As illustrated in FIG. 4, when the vehicle to which vehicle system according to the present embodiment is applied is operating in the parking mode, the control unit 500 controls the first switch S1 so that the auxiliary battery 400 is connected to the camera 200 and the IR to supply power from the auxiliary battery 400 to the camera 200 and the IR lamp 100, and controls the third switch S3 to disconnect between the main battery 300 and the auxiliary battery 400. In addition, the control unit 500 transmits the control signal to the IR LDM 600 to reduce the magnitude of the DC current applied to the IR lamp 100, thereby reducing the amount of light of the LED included in the IR lamp 100. This reduces the power consumed by the auxiliary battery 400 when (or in response to determining that) the vehicle is operating in the parking mode, and supplies power from the auxiliary battery 400 to the camera 200 and the IR lamp 100 side for as long as possible, thereby operating the camera 200 and the IR lamp 100 for a long time.

As described above, according to a vehicle system of the present invention, when a vehicle to which the vehicle system according to the present invention is applied is in a parking mode, since only some of a plurality of LEDs included in the IR lamp operate or a magnitude of current applied to the LEDs is reduced to reduce the amount of light from the LED and reduce power consumed by the IR lamp, in the parking mode, an auxiliary battery that supplies power to the IR lamp supplies power to the IR lamp and camera for as long as possible, thereby increasing an operating time of the IR lamp and camera.

Although preferred embodiments of the present invention have been described above, the embodiments disclosed in the present invention are only for explaining, not limiting, the technical spirit of the present invention. Accordingly, the technical spirit of the present invention includes not only each disclosed embodiment, but also a combination of the disclosed embodiments, and further, the scope of the technical spirit of the present invention is not limited by these embodiments. In addition, many modifications and alterations of the present disclosure may be made by those skilled in the art to which the present disclosure pertains without departing from the spirit and scope of the accompanying claims. In addition, it is to be considered that all of these modifications and alterations fall within the scope of the present disclosure.

What is claimed is:

1. A power system for a vehicle, comprising:

a main battery and an auxiliary battery;

a camera configured to capture an image of an area around the vehicle;

an infrared (IR) lamp configured to irradiate light having an IR wavelength and including a plurality of light-emitting diodes (LEDs) grouped into a plurality of LED groups including a first LED group and a second LED group, each LED group containing at least one LED; and a control unit configured to:

in response to the vehicle operating in a driving mode, connect the camera and the first and second LED groups of the IR lamp to the main battery of the vehicle; and in response to the vehicle operating in a parking mode, disconnect the camera and the IR lamp from the main battery and connect the camera and the first LED group of the IR lamp to the auxiliary battery of the vehicle, wherein the control unit is configured to operate such that, in response to the vehicle operating in the parking mode, the camera and the first LED group of the IR lamp stay disconnected from the main battery and stay connected to the auxiliary battery, and the second LED group of the IR lamp stays disconnected from the main battery and the auxiliary battery.

2. The power system of claim 1, wherein, in response to the vehicle operating in the driving mode, the control unit is configured to turn on all of the plurality of LEDs.

3. The power system of claim 1, wherein, in response to the vehicle operating in the parking mode, the control unit is configured to turn on less than all of the plurality of LEDs.

4. The power system of claim 1, wherein, in response to the vehicle operating in the driving mode, the control unit is configured to increase a current applied to the plurality of LEDs to a maximum value.

5. The power system of claim 1, wherein, in response to the vehicle operating in the parking mode, the control unit is configured to reduce a current applied to the plurality of LEDs.

6. The power system of claim 1, wherein, in response to the vehicle operating in the driving mode, the control unit is configured to charge, using the main battery, the auxiliary battery.

* * * * *